US012718580B2

(12) United States Patent
Okamoto et al.

(10) Patent No.: US 12,718,580 B2
(45) Date of Patent: Aug. 25, 2026

(54) INFORMATION PROCESSING SYSTEM, INFORMATION PROCESSING APPARATUS, AND INFORMATION PROCESSING METHOD

(71) Applicants: Toshihiro Okamoto, Kanagawa (JP); Yosuke Sato, Tokyo (JP); Kenji Nagashima, Kanagawa (JP); Takuya Yamauchi, Kanagawa (JP); Mei Oyama, Kanagawa (JP); Sukehiro Kimura, Kanagawa (JP); Shin Aoki, Tokyo (JP)

(72) Inventors: Toshihiro Okamoto, Kanagawa (JP); Yosuke Sato, Tokyo (JP); Kenji Nagashima, Kanagawa (JP); Takuya Yamauchi, Kanagawa (JP); Mei Oyama, Kanagawa (JP); Sukehiro Kimura, Kanagawa (JP); Shin Aoki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 19/089,706

(22) Filed: Mar. 25, 2025

(65) Prior Publication Data

US 2025/0308246 A1 Oct. 2, 2025

(30) Foreign Application Priority Data

Mar. 29, 2024 (JP) ................................ 2024-057011

(51) Int. Cl.
*G06T 7/73* (2017.01)
*G06T 7/60* (2017.01)
(Continued)

(52) U.S. Cl.
CPC ................ *G06V 20/56* (2022.01); *G06T 7/60* (2013.01); *H04N 23/698* (2023.01); *G06V 2201/07* (2022.01)

(58) Field of Classification Search
CPC ...... G06V 20/56; G06V 2201/07; G06T 7/60; G06T 2207/30204; G06T 2207/30252; G06T 7/74; H04N 23/698
See application file for complete search history.

(56) References Cited

U.S. PATENT DOCUMENTS

2023/0139590 A1* 5/2023 Wilson ................ G05B 19/042 700/28
2023/0196609 A1 6/2023 Klinger et al.
(Continued)

FOREIGN PATENT DOCUMENTS

JP 7240038 B1 3/2023
JP 7312089 B2 7/2023
(Continued)

OTHER PUBLICATIONS

Extended European Search Report dated Aug. 4, 2025 issued in corresponding European Patent Appln. No. 25165930.6.
(Continued)

*Primary Examiner* — Jamara A Franklin
(74) *Attorney, Agent, or Firm* — Harness, Dickey & Pierce, P.L.C.

(57) ABSTRACT

An information processing system includes a mobile body including a holding device that holds an object and allows the object to be moved up and down and a marker disposed on the holding device, at least one imaging device disposed at the mobile body at a position not on a same line with respect to a direction in which the object is moved up and down and captures an image of surroundings of the mobile body, and circuitry to detect a position of the marker based
(Continued)

on an image of the marker captured by the at least one imaging device to estimate a height of the object.

10 Claims, 12 Drawing Sheets

(51) Int. Cl.
*G06V 20/56* (2022.01)
*H04N 23/698* (2023.01)

(56) References Cited

U.S. PATENT DOCUMENTS

2024/0127471 A1 4/2024 Okamoto et al.
2024/0210186 A1* 6/2024 Akashi ................. G01C 21/005

FOREIGN PATENT DOCUMENTS

JP 2023-109363 A 8/2023
JP 7325085 B2 8/2023
WO 2022/180453 A1 9/2022

OTHER PUBLICATIONS

Tomono Masahiro, Yoshitaka Hara, “Current and Future Directions in SLAM,” Systems, Control and Information, 2020, vol. 64, No. 2, pp. 45-50, from https://www.jstage.jst.go.jp/article/isciesci/64/2/64_45/_article/-char/ja/.

* cited by examiner

FIG. 3C
FIG. 3B
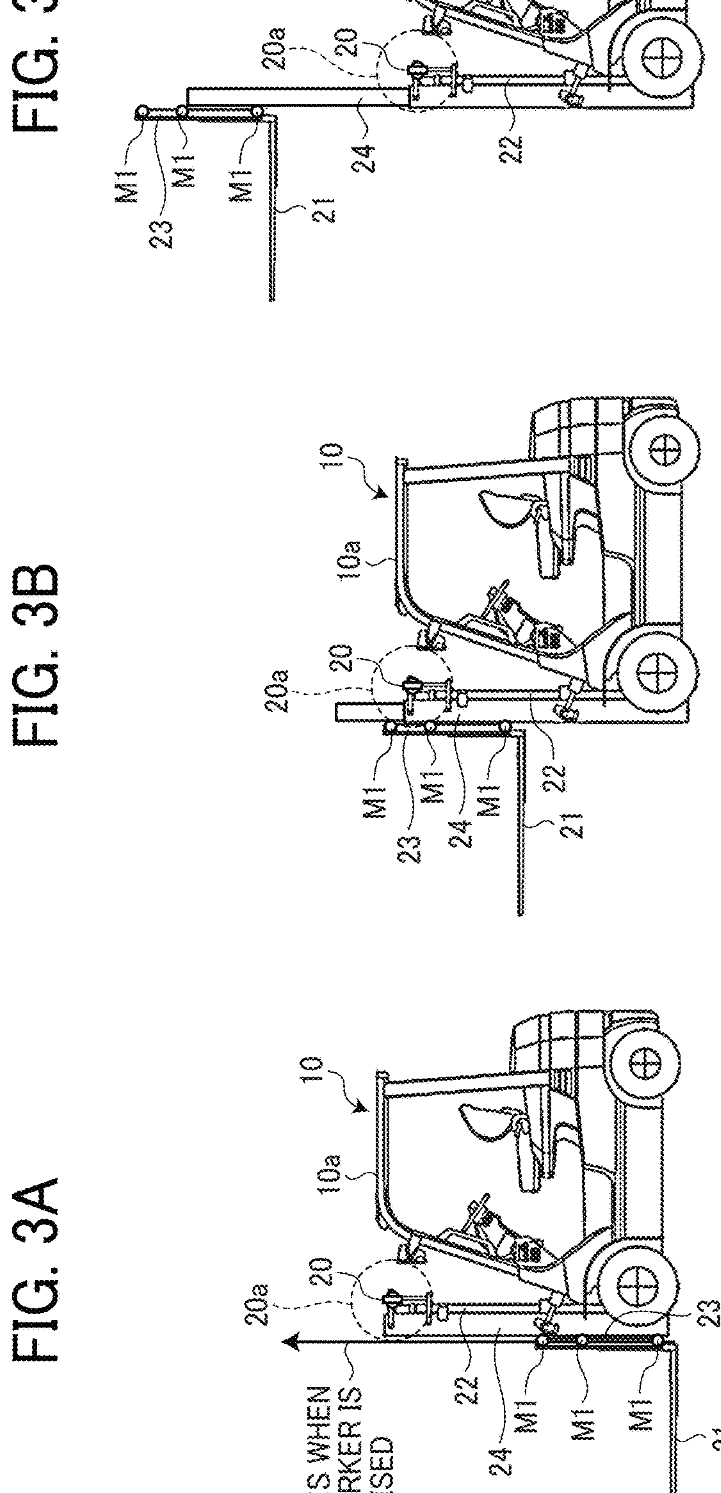
FIG. 3A
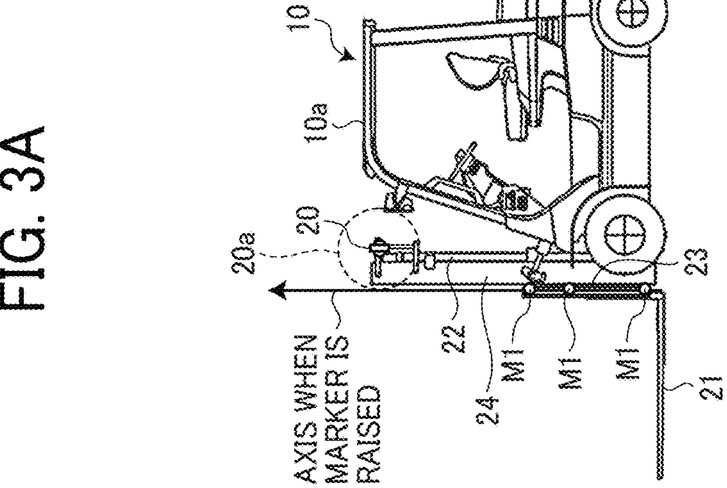

FIG. 6

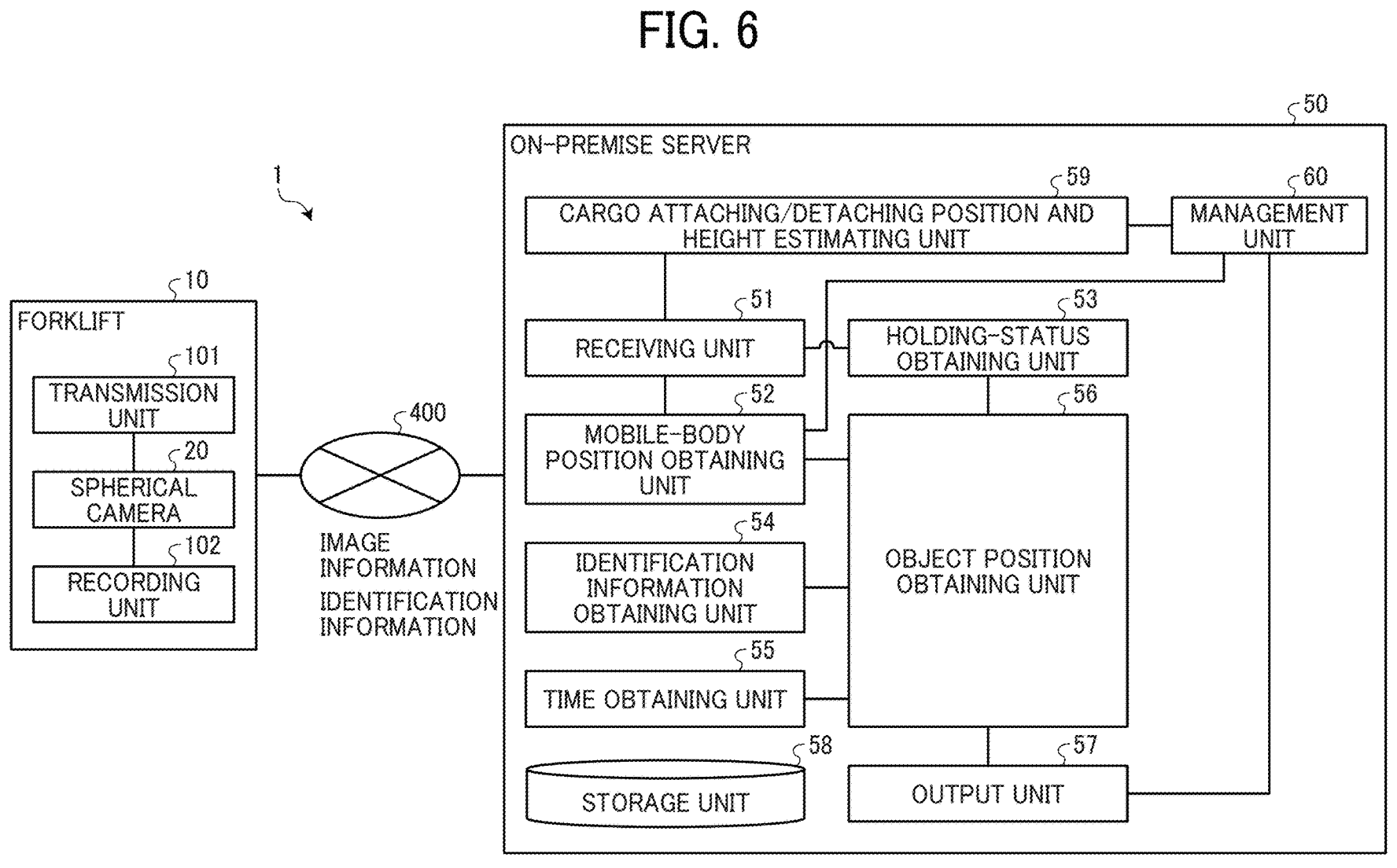

1
50
ON-PREMISE SERVER
59 CARGO ATTACHING/DETACHING POSITION AND HEIGHT ESTIMATING UNIT
60 MANAGEMENT UNIT
51 RECEIVING UNIT
53 HOLDING-STATUS OBTAINING UNIT
52 MOBILE-BODY POSITION OBTAINING UNIT
56 OBJECT POSITION OBTAINING UNIT
54 IDENTIFICATION INFORMATION OBTAINING UNIT
55 TIME OBTAINING UNIT
57 OUTPUT UNIT
58 STORAGE UNIT
400
IMAGE INFORMATION
IDENTIFICATION INFORMATION
10 FORKLIFT
101 TRANSMISSION UNIT
20 SPHERICAL CAMERA
102 RECORDING UNIT

INFORMATION PROCESSING SYSTEM, INFORMATION PROCESSING APPARATUS, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2024-057011, filed on Mar. 29, 2024, in the Japan Patent Office, the entire disclosure of which is hereby incorporated by reference herein.

BACKGROUND

Technical Field

The present disclosure relates to an information processing system, an information processing apparatus, and an information processing method.

Related Art

A technique has been proposed that the position information of a mobile body such as a forklift traveling primarily indoors in a warehouse or a factory is estimated based on an image captured by a camera disposed at the mobile body and the position information of an object such as a cargo or pallet is obtained by recognizing the carrying state of the object (whether the object is being held or not being held) moved by the mobile body.

In the art, a technique is disclosed that, in a mobile body that moves an object and includes a backrest with a fork used for moving the object, a camera is disposed at the lower portion of the backrest at a position on an extension line of the direction in which the backrest is moved up and down. The height of the object moved by the forklift is detected based on an image obtained by the camera capturing a marker disposed on the backrest at a position right above the camera.

SUMMARY

The present disclosure described herein provides an information processing system including a mobile body including a holding device that holds an object and allows the object to be moved up and down and a marker disposed on the holding device, at least one imaging device disposed at the mobile body at a position not on a same line with respect to a direction in which the object is moved up and down and captures an image of surroundings of the mobile body, and circuitry to detect a position of the marker based on an image of the marker captured by the at least one imaging device to estimate a height of the object.

In another aspect, an information processing apparatus for processing position information of an object includes circuitry to detect a position of a marker disposed on a holding device included in a mobile body based on an image of the marker captured by at least one imaging device disposed at the mobile body at a position not on a same line with respect to a direction in which the object is moved up and down by the holding device to estimate a height of the object.

In another aspect, an information processing method performed by an information processing apparatus includes processing position information of an object moved by a mobile body including a holding device that holds the object and allows the object to be moved up and down and a marker disposed on the holding device and detecting a position of the marker disposed on the holding device based on an image of the marker captured by at least one imaging device disposed at the mobile body at a position not on a same line with respect to a direction in which the object is moved up and down to estimate a height of the object.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 3A to 3C are diagrams each illustrating a relationship between a spherical camera disposed at a forklift and markers;

FIG. 6 is a block diagram illustrating a functional configuration of an information processing system;

Figure 1:
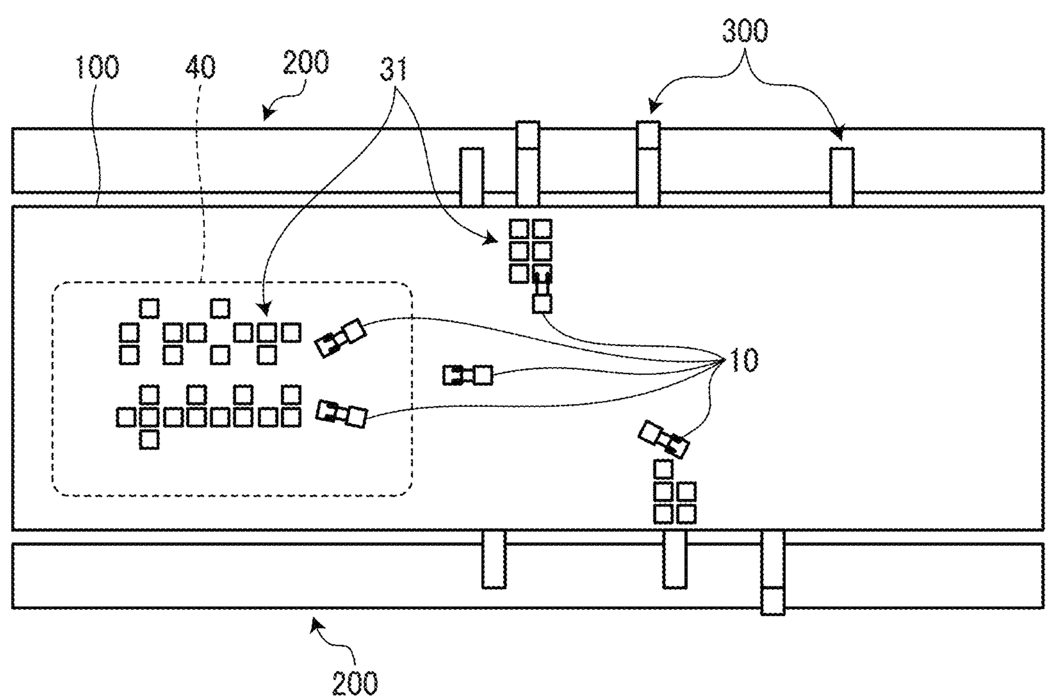
FIG. 1 is a diagram illustrating position information of objects in a warehouse.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An information processing system, an information processing apparatus, and an information processing method are described in detail below with reference to the accompanying drawings.

First Embodiment

An information processing apparatus according to a first embodiment processes the position information of an object moved by a mobile body. Examples of the mobile body include a counterbalance type forklift truck (that may be referred to simply as a forklift in the following description), and examples of the object include a pallet. The information processing apparatus processes the position information of the object such as the pallet moved by the forklift, recognizes the movement of the object, and tracks the object.

FIG. 1 is a diagram illustrating position information of objects in a warehouse. In FIG. 1, the inside of a warehouse 100 and areas around the warehouse 100 are illustrated as viewed from the ceiling above.

For example, the warehouse 100 is a terminal warehouse situated at a transit point in transportation. One type of terminal warehouse is a so-called cross-docking warehouse. In a cross-docking warehouse, pallets of products are received from, for example, a factory or a wholesale company and temporarily stored. At the time of shipment, the packing styles of the pallets are not changed, and different types of pallets are combined and shipped by region of the retail stores.

As illustrated in FIG. 1, the warehouse 100 is surrounded by truck yards 200. In FIG. 1, multiple containers 300 are carried by trailers and detached from the trailers in the truck yards 200, and the cargo beds of trucks are linked to the warehouse 100. In the warehouse 100, forklifts 10 carry pallets 31. In the following description, any one of the containers 300 is referred to as a container 300 and any one of the truck yards 200 is referred to as a truck yard 200 unless particularly distinguished from one another. Also, in the following description, any one of the forklifts 10 is referred to as a forklift 10 and any one of the pallets 31 is referred to as a pallet 31 unless particularly distinguished from one another. The forklift 10 picks up the pallet 31 from at least one of the cargo bed of one of the trucks arrived at the truck yards 200 and the container 300 carried by one of the trailers.

The forklift 10 carries the pallet 31 and temporarily loads the pallet 31 at a temporary storage place 40. At the time of shipment, the forklift 10 carries the pallet 31 to a place in the warehouse 100 near the truck yard 200 and aligns the pallet 31. Then, the forklift 10 loads the pallet 31 onto the cargo bed of the truck or into the container 300.

In the temporary storage place 40, in order to flexibly allocate space for accommodating daily changes in the types or amounts of products to be brought in and out, sections are not designated for the products individually in many cases. On the other hand, since multiple workers temporarily place the pallets 31 in any desired places, at the time of shipment, a target pallet 31 needs to be searched for among the pallets 31 temporarily placed.

In order to perform this search work efficiently, there is a demand for an information processing system that recognizes the movement of the pallets 31 in the warehouse 100 and visualizes the pallets 31 by tracking the pallets 31, while effectively utilizing the space by not designating the temporary storage place for the pallets 31. The information processing apparatus according to the present embodiment is used in such an information processing system.

The information processing system including the information processing apparatus according to the first embodiment is described below.

Overall Configuration of Information Processing System

Figure 2:
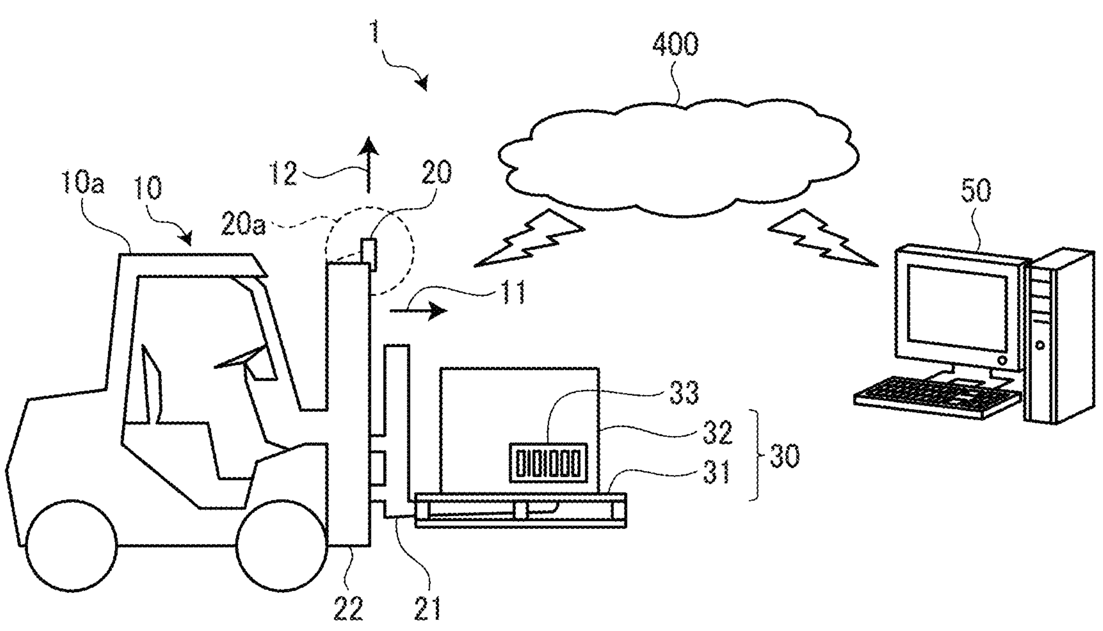
FIG. 2 is a diagram illustrating an overall configuration of an information processing system.

FIG. 2 is a diagram illustrating an overall configuration of an information processing system 1 according to the first embodiment. As illustrated in FIG. 2, the information processing system 1 includes the forklift 10, a spherical camera 20, and an on-premise server 50. These components are communicably connected to one another via a network 400 such as a local area network (LAN). To the network 400, apparatuses or devices other than the apparatuses and devices described above, such as an external server or an image forming apparatus, may be communicably connected.

The forklift 10 is an example of the mobile body that holds the pallet 31 on which a cargo 32 is placed, and carries the pallet 31 and the cargo 32 while holding the pallet 31 on which the cargo 32 is placed. The carriage performed by the mobile body is an example of movement performed by the mobile body. The pallet 31 and the cargo 32 are each examples of the object. In the following description, the pallet 31 and the cargo 32 may be collectively referred to as objects 30 unless particularly distinguished from each other. Further, any one of the objects 30 may be referred to as an object 30 unless particularly distinguished from each other. Furthermore, the forklift 10 may refer to multiple forklifts, the pallet 31 may refer to multiple pallets, and the cargo 32 may refer to multiple cargoes.

The forklift 10 may carry the object 30 according to the operation by a worker or may carry the object 30 automatically without the intervention of a worker.

The spherical camera 20 is an example of an imaging device that is disposed at the forklift 10 and captures an image of the surroundings of the forklift 10. The spherical camera 20 is a camera that captures an image in all directions of 360 degrees around the spherical camera 20 as a viewing angle. The spherical cameras 20 captures an image in a direction 20*a*.

The spherical image (omnidirectional image) captured by the spherical camera 20 is an example of a captured image. The imaging device is not limited to the spherical camera 20 capable of capturing a spherical image, but may be any camera that has a wide angle of view and capable of capturing an image of the surroundings of the forklift 10. Further, the spherical image captured with the spherical camera 20 is not necessarily a full-spherical image of 360 degrees, but may be a spherical image of substantially 360 degrees. The captured image is not necessarily a spherical image or omnidirectional image.

The spherical image includes a captured image of the object 30 as viewed in a conveyance direction 11 from the forklift 10 and a view in a vertically upward direction 12 as viewed from the forklift 10. The conveyance direction 11 is a direction to which the forklift 10 moves, and the vertically upward direction 12 is a direction toward the ceiling and orthogonal to a roof surface of the forklift 10. Since the spherical camera 20 captures an omnidirectional image in all directions, areas ahead and above the forklift 10 are captured in a single image. The conveyance direction 11 is an example of a movement direction.

The spherical camera 20 is preferably disposed at the head guard (i.e., the roof of the driver's seat) 10*a* of the forklift 10 or on an outer mast 22 supporting a fork 21. Thus, a field of view is appropriately secured for capturing an image of the areas ahead of and above the forklift 10. The fork 21 and a backrest 23 are examples of a holding device provided for the forklift 10, which holds an object and allows the object to be moved up and down. In the present embodiment, the spherical camera 20 is disposed at the outer mast 22 supporting the fork 21.

The spherical camera 20 has a wireless communication function, which may be implemented by a network interface circuit, and transmits the captured spherical image to the on-premise server 50 via the network 400.

Figure 4:
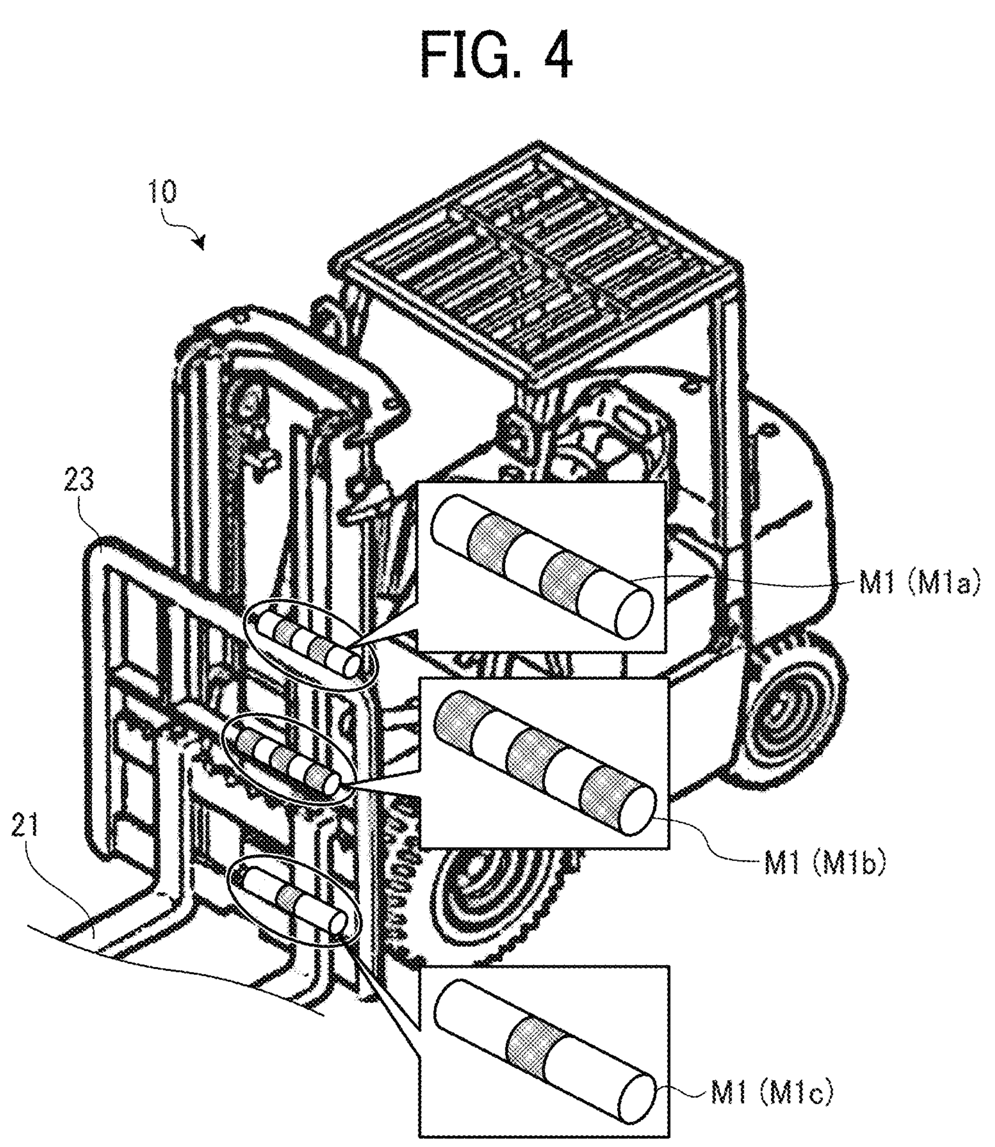
FIG. 4 is a diagram illustrating configurations of markers and ways in which the markers are disposed.

FIGS. 3A to 3C are diagrams each illustrating a relationship between the spherical camera 20 disposed at the forklift 10 and markers M1. Any one of the markers M1 may be referred to as a marker M1 unless particularly distinguished from one another. FIG. 4 is a diagram illustrating configurations of the markers M1 and ways in which the markers M1 are disposed. In each of FIGS. 3A to 3C, a case in which the spherical camera 20 is disposed at the outer mast 22 supporting the fork 21 of the forklift 10 is illustrated. In FIGS. 3A to 3C, how the markers M1 are raised as the fork 21 of the forklift 10 rises is illustrated.

The outer mast 22 is a supporting member supporting an inner mast 24 so as to be movable up and down. The inner mast 24 is a member used for ascending and descending. The inner mast 24 is driven by a chain to be moved up and down and moves the fork 21 up and down. With this structure, as the inner mast 24 is raised, the backrest 23 and the forks 21 are raised with the inner mast 24, thus raising the forks 21 of the forklift 10.

As illustrated in FIGS. 3A to 3C, the spherical camera 20 is disposed on the outer mast 22 at a position not on the same line with respect to the direction (the vertically upward direction 12) of upward and downward in which the fork 21 of the forklift 10 and the backrest 23 that is moved up and down integrally with the fork 21 move. Since the outer mast 22 does not move up or down, the spherical camera 20 can be wired to the body of the forklift 10 by a cable.

In the present embodiment, the marker M1 that serves as a mark disposed on the backrest 23 is imaged by the spherical camera 20. The image captured by the spherical camera 20 is subjected to image recognition to detect the type of the marker M1, and the height of the fork 21 is obtained based on the type and position of the detected marker M1.

As illustrated in FIGS. 3A to 3C and 4, the backrest 23 are provided with multiple markers M1 each having a cylindrical shape. The marker M1 is imaged by the spherical camera 20 and subjected to image recognition. The position of the marker M1 is detected based on the image of the marker M1 captured by the spherical camera 20, and is used to estimate the height of the fork 21 of the forklift 10 and the object 30. In the present embodiment, three markers M1 are disposed at positions of the backrest 23 at different heights.

As illustrated in FIG. 4, each of the markers M1 disposed on the backrest 23 has a cylindrical shape. Each of the markers M1 has a different pattern depending on the position of the backrest 23 where the marker M1 is disposed. The three markers M1 having different patterns are referred to as a marker M1*a*, a marker M1*b*, and a marker M1*c*, respectively. By forming the marker M1 in a cylindrical shape, even when the relative angle between the spherical camera 20 used for detecting the height and the marker M1 changes, the marker M1 is visually perceived as having substantially the same cylindrical thickness, and the pattern of the marker M1 can be stably detected.

The cargo 32 is provided with a barcode 33, which is an example of identification information indicating the cargo 32. Such a barcode may be attached to the pallet 31 and used as identification information indicating the pallet 31. The barcode 33 is read by a reader such as a barcode reader, and the identification information obtained by the reading is transmitted to the on-premise server 50 via the network 400. The identification information is not limited to a barcode, but may be a QUICK RESPONSE (QR) CODE or an identification (ID) number such as an identifier.

The on-premise server 50 is an example of an information processing apparatus that is disposed at the warehouse 100 and processes the position information of the object 30 carried by the forklift 10. The on-premise server 50 can be replaced with a cloud server (a computing device disposed outside the warehouse environment). In this way, the installation cost and running cost can be reduced.

The on-premise server 50 processes the position information of the object 30 based on the spherical image and the identification information indicating the object 30 received via the network 400. The position information of the objects 30 held by multiple forklifts 10 can be obtained using the spherical images captured by multiple spherical cameras 20 disposed at the multiple forklifts 10.

The on-premise server 50 executes a calculation process for recognizing a self-position of the forklift 10 based on the spherical image received via the network 400. The on-premise server 50 uses the spherical images captured by the multiple spherical cameras 20 to execute the calculation process for recognizing a self-position for grasping the current positions of the multiple forklifts 10.

The forklift 10 is provided with, for example, a single-board computer (vehicular edge computer). The forklift 10 has the spherical camera 20 connected to the single-board computer via a wire. The calculation process for recognizing a self-position is executed by the single-board computer, and the result of the calculation process is transmitted to the on-premise server 50 by wireless communication via the network 400 and is collected. In this way, the on-premise server 50 may grasp the current position of each forklift 10.

The on-premise server 50 reads out, for example, the identifier, the position information, and video information from a hard disk (HD) 504 (see FIG. 5) included in the on-premise server 50, specifies the position information indicating the final position of the forklift 10 or the pallet 31, and outputs the position information indicating the final position to an information terminal such as a smartphone to visualize the position information indicating the final position.

As described above, the information processing system 1 includes the on-premise server 50 outside the forklift 10, and includes a processor such as the single-board computer on the forklift 10. In this way, the power consumption by the single-board computer provided for the forklift 10 is reduced. Specifically, the power consumption can be reduced from approximately 40 watts (W) previously required to approximately 10 W.

However, as the forklift 10 moves around, an interruption in communication between the forklift 10 (or the vehicular edge computer) and the on-premise server 50 may occur. In the present embodiment, the forklift 10 (or the vehicular edge computer) and the on-premise server 50 are each provided with a communication state confirmation unit, which will be described in detail later. With the communication state confirmation unit, the state of the connection in the network 400 is monitored. When the communication is interrupted, the data that has not been transmitted during the interruption of the communication is collectively transmitted after the connection is established again.

Hardware Configuration of On-Premise Server

Figure 5:
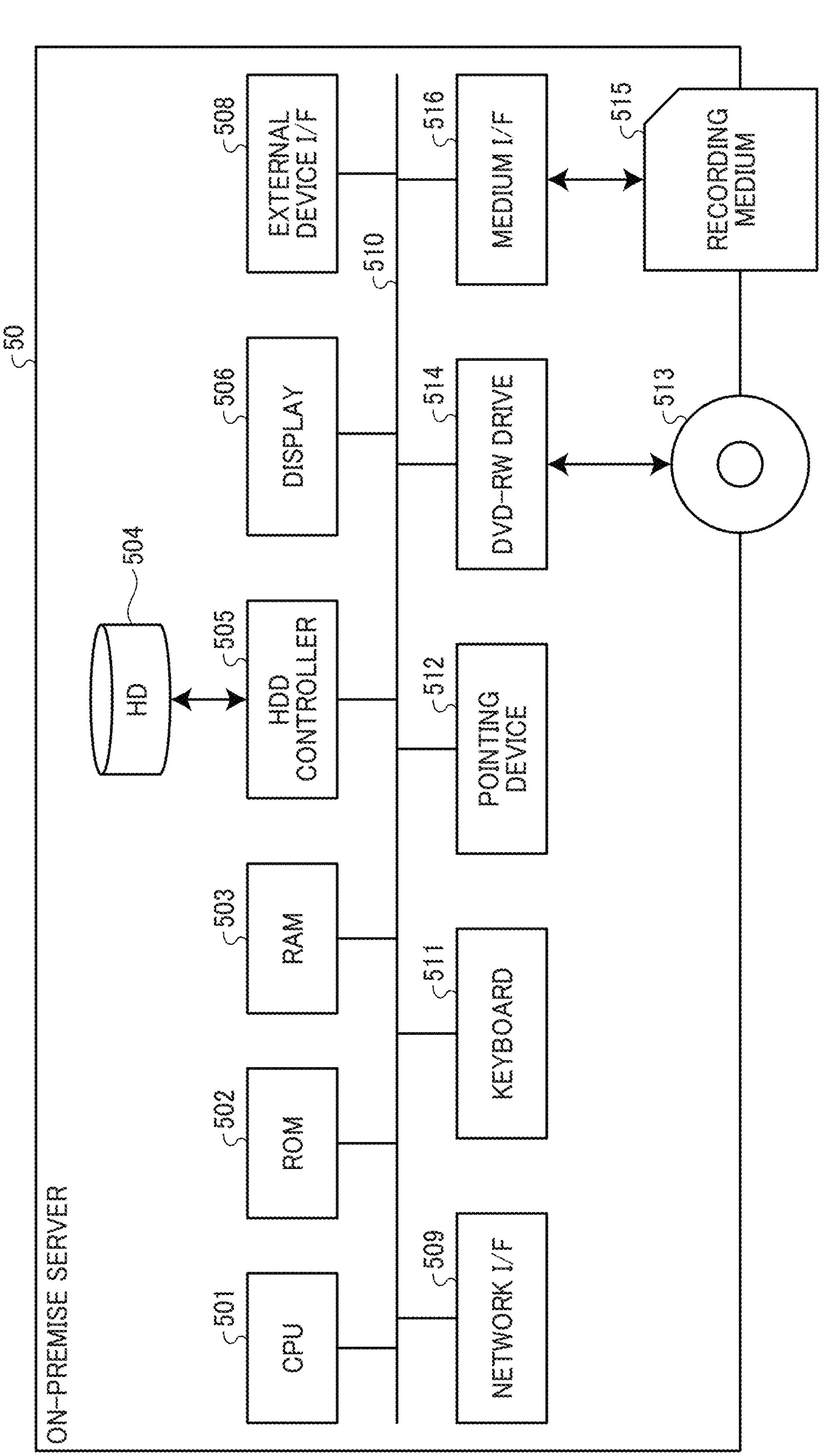
FIG. 5 is a block diagram illustrating a hardware configuration of an on-premise server.

FIG. 5 is a block diagram illustrating a hardware configuration of the on-premise server 50. The on-premise server 50 is implemented by a computer.

As illustrated in FIG. 5, the on-premise server 50 includes a central processing unit (CPU) 501, a read-only memory (ROM) 502, a random-access memory (RAM) 503, the HD 504, a hard disk drive (HDD) controller 505, and a display 506. The on-premise server 50 further includes an external device interface (I/F) 508, a network I/F 509, a bus line 510, a keyboard 511, a pointing device 512, a digital versatile disc rewritable (DVD-RW) drive 514, and a medium I/F 516.

The CPU 501 controls the entire operation of the on-premise server 50. The ROM 502 stores a program such as an initial program loader (IPL) used for booting the CPU 501. The RAM 503 is used as a work area for the CPU 501.

The HD 504 stores various data such as a program. The HDD controller 505 controls the reading and writing of various data from and to the HD 504 under the control of the CPU 501. The display 506 displays various information such as a cursor, a menu, a window, characters, and images.

The external device I/F 508, which may be implemented by an interface circuit, is an interface that controls communication of data with various external devices. Examples of the external devices include, but not limited to, a universal serial bus (USB) memory and a printer. The network I/F 509 is an interface circuit that controls data communication through the network 400. The bus line 510 is, for example, an address bus or a data bus, which electrically connects the components or elements such as the CPU 501 illustrated in FIG. 5 to each other.

The keyboard 511 is an example of an input device provided with a plurality of keys used for, for example, inputting characters, numerical values, and various instructions. The pointing device 512 is an example of an input device used for, for example, selecting or executing various instructions, selecting an object to be processed, and moving a cursor being displayed. The DVD-RW drive 514 controls the reading and writing of various data from and to a DVD-RW 513, which is an example of a removable recording medium. The removable recording medium is not limited to a DVD-RW and may be, for example, a digital versatile disc-recordable (DVD-R). The medium I/F 516 controls the reading and writing (storing) of data from and to a recording medium 515 such as a flash memory.

Functional Configuration of Information Processing System

FIG. 6 is a block diagram illustrating a functional configuration of the information processing system 1. As illustrated in FIG. 6, the on-premise server 50 includes a receiving unit 51, a mobile-body position obtaining unit 52, a holding-status obtaining unit 53, an identification information obtaining unit 54, a time obtaining unit 55, an object position obtaining unit 56, an output unit 57, a storage unit 58, a cargo attaching/detaching position and height estimating unit 59, and a management unit 60.

These functional units of the on-premise server 50 are implemented by or caused to function by one or more of the hardware components illustrated in FIG. 5 operating in accordance with instructions from the CPU 501 according to the control program loaded from the HD 504 to the RAM 503.

The forklift 10 is provided with the spherical camera 20, a transmission unit 101, and a recording unit 102. The spherical camera 20 captures an image of the surroundings such as a spherical image. The recording unit 102 records the spherical image acquired by the spherical camera 20 on a recording medium. The transmission unit 101 transmits the spherical image acquired by the spherical camera 20 to the on-premise server 50 via the network 400.

The functions of the transmission unit 101 and the recording unit 102 are implemented by an electric circuit provided for either the forklift 10 or the spherical camera 20, or may be implemented by software executed by a CPU. Alternatively, the functions of the transmission unit 101 and the recording unit 102 may be implemented by multiple circuits or multiple software components.

The on-premise server 50 obtains the position information of the object 30 based on the position information of the forklift 10 obtained based on the spherical image captured by the spherical camera 20 and holding information indicating whether the object 30 is being held by the forklift 10. The on-premise server 50 can output the obtained position information of the object 30 to an external device via the output unit 57.

The receiving unit 51 receives, via the network 400, the spherical image captured by the spherical camera 20 and transmitted by the transmission unit 101, and outputs the received spherical image to the mobile-body position obtaining unit 52 and the holding-status obtaining unit 53. The receiving unit 51 also receives, via the network 400, the identification information read by a reader such as a barcode reader, and outputs the received identification information to the identification information obtaining unit 54.

The mobile-body position obtaining unit 52 executes a calculation process to obtain the position information of the forklift 10 based on the spherical image input from the receiving unit 51, and outputs the obtained position information to the object position obtaining unit 56. For example, the technology for simultaneously performing creation of a map and recognition of a position (simultaneous localization and mapping (SLAM)) may be applied to the calculation process (a self-position estimation process) for obtaining the position information of the forklift 10.

The holding-status obtaining unit 53 executes a calculation process to obtain the holding information indicating whether the object 30 is being held by the forklift 10 based on the input spherical image, and outputs the obtained holding information to the object position obtaining unit 56.

The identification information obtaining unit 54 receives the identification information from the receiving unit 51 to obtain the identification information, and outputs the obtained identification information to the object position obtaining unit 56. However, the obtainment of the identification information by the identification information obtaining unit 54 is not limited to the obtainment via the network 400. For example, the identification information obtaining unit 54 may obtain the identification information input by a user such as an administrator using the keyboard 511 or the pointing device 512 of FIG. 5, may obtain the identification information stored in advance in the storage unit 58, or may obtain the identification information via the external device I/F 508. The administrator is an administrator of the information processing system 1 or the warehouse 100.

The time obtaining unit 55 obtains time information indicating the times when the receiving unit 51 receives the spherical image and the identification information, and outputs the time information to the object position obtaining unit 56.

The object position obtaining unit 56 obtains the position information of the object 30 based on the position information of the forklift 10 and the holding information. The object position obtaining unit 56 also associates the position information of the object 30, the identification information indicating the object 30, and the time information with one another, and outputs the association information through the output unit 57. The output destination of the output unit 57 is an external device such as a personal computer (PC), a display device such as the display 506, or a storage device such as the HD 504.

The cargo attaching/detaching position and height estimating unit 59 obtains a vehicle position estimation result, which is the position information of the forklift 10, from the mobile-body position obtaining unit 52, and also obtains a height estimation result, which is height position information indicating the height of the fork 21 estimated based on the pattern of the marker M1 disposed on the backrest 23 included in the input spherical image. Then, the cargo attaching/detaching position and height estimating unit 59 estimates the attachment or detachment position and height when the forklift 10 attaches or detaches the object 30. The cargo attaching/detaching position and height estimating unit 59 is an example of an estimating unit that detects the position of the marker M1 based on the image of the marker M1 captured by the spherical camera 20 to estimate the height of the object 30.

The storage unit 58 may store the identification information indicating the object 30 such as the pallet 31 or the cargo 32.

The management unit 60 manages the attachment state of the object 30 such as the cargo 32 and the detachment state of the object 30 such as the cargo 32 in the forklift 10.

Process Executed by On-Premise Server

Figure 7:
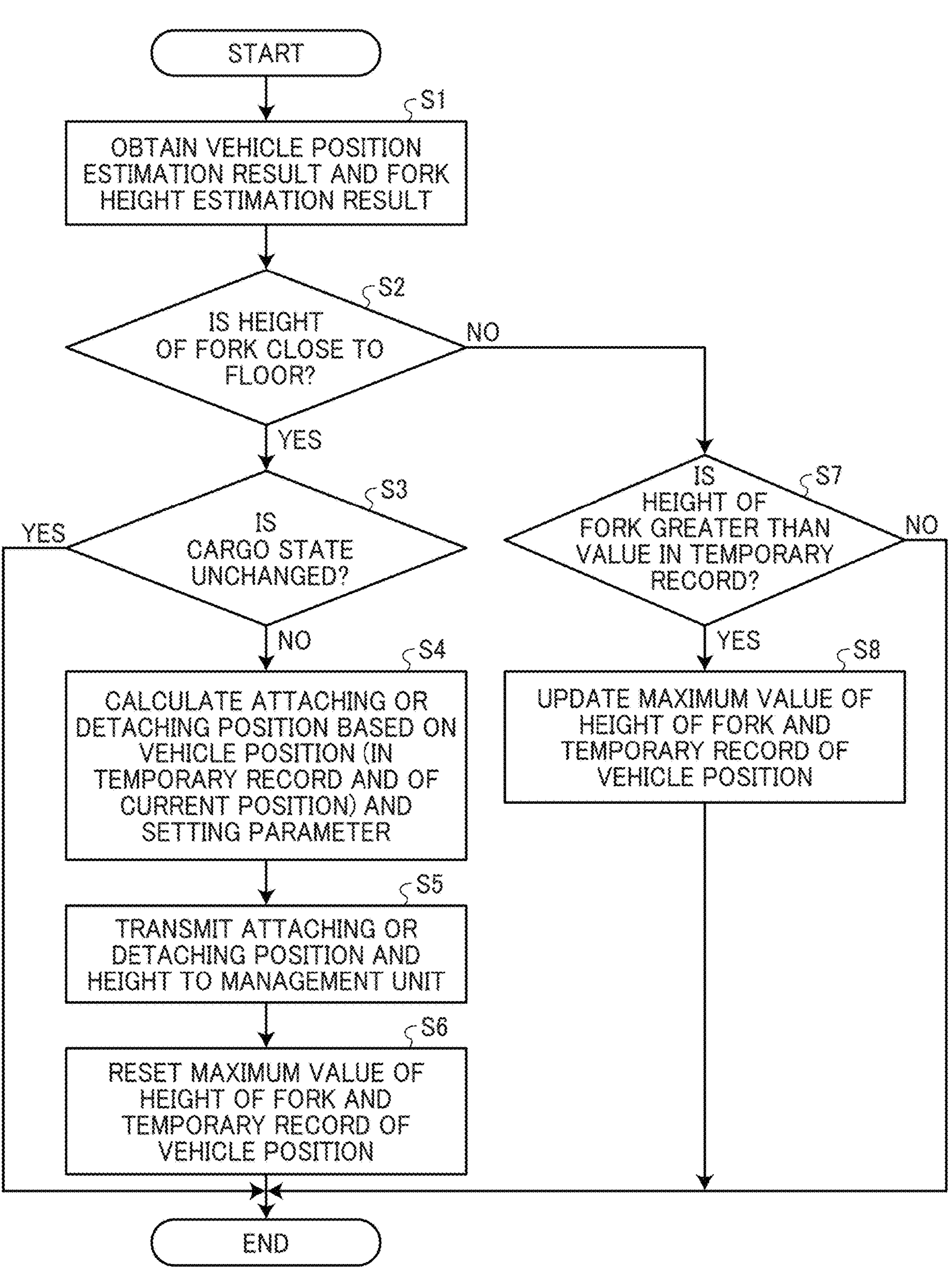
FIG. 7 is a flowchart of a process to estimate a cargo attaching or detaching position and height executed by a cargo attaching/detaching position and height estimating unit.

FIG. 7 is a flowchart of a process to estimate a cargo attaching or detaching position and height executed by the cargo attaching/detaching position and height estimating unit 59. In FIG. 7, a process triggered by the timing when the on-premise server 50 receives an operation to start obtaining the position information of the object 30 is illustrated. The operation to start obtaining the position information of the object 30 is performed by a user such as the administrator, using, for example, the pointing device 512 illustrated in FIG. 5.

In step S1, the cargo attaching/detaching position and height estimating unit 59 obtains the vehicle position estimation result, which is the position information of the forklift 10, from the mobile-body position obtaining unit 52, and obtains the height estimation result, which is the height position information of the fork 21 estimated based on the pattern of the marker M1 disposed on the backrest 23 included in the input spherical image.

In step S2, the cargo attaching/detaching position and height estimating unit 59 compares the height of the fork 21 of the forklift 10 with a threshold value determined in advance to determine whether the height of the fork 21 is close to the floor.

In the case where the height of the fork 21 of the forklift 10 is determined to be close to the floor (YES in step S2), in step S3, the cargo attaching/detaching position and height estimating unit 59 determines whether the cargo state is unchanged, that is, whether the state is maintained in which the object 30 is being held or the object 30 is not held, as the determination of the presence of the object 30 in the fork 21.

In the case where the cargo state is determined to be unchanged through the image recognition continuously performed within a certain period of time on the input spherical image (YES in step S3), the cargo attaching/detaching position and height estimating unit 59 determines that the object 30 is being held in the fork 21 or the object 30 is not held in the fork 21, and ends the process.

On the other hand, in the case where the cargo state is determined not to be unchanged through the image recognition continuously performed within a certain period of time on the input spherical image (NO in step S3), the cargo attaching/detaching position and height estimating unit 59 determines that an event of the attachment (i.e., attaching the object 30 to the fork 21) or the detachment (i.e., detaching the object 30 from the fork 21) has occurred.

In the case where either the attachment or the detachment is determined to have occurred, in step S4, the cargo attaching/detaching position and height estimating unit 59 calculates the attaching or detaching position of the object 30 based on the vehicle positions such as a position in a temporary record and a current position, and the setting parameter.

In step S5, the cargo attaching/detaching position and height estimating unit 59 transmits the calculated attaching or detaching position and height of the object 30 to the management unit 60.

In step S6, the cargo attaching/detaching position and height estimating unit 59 resets the temporary records of the maximum value of the height of the fork 21 and the vehicle position of the forklift 10.

On the other hand, in the case where the height of the fork 21 of the forklift 10 is determined not to be close to the floor (NO in step S2), in step S7, the cargo attaching/detaching position and height estimating unit 59 determines whether the height of the fork 21 is greater than the value of the height of the fork 21 in the temporary record.

In the case where the height of the fork 21 is determined to be greater than the value of the height of the fork 21 in the temporary record (YES in step S7), in step S8, the cargo attaching/detaching position and height estimating unit 59 updates the records of the maximum value of the height of the fork 21 and the vehicle position of the forklift 10.

On the other hand, in the case where the height of the fork 21 is determined not to be greater than the value of the height of the fork 21 in the temporary record (NO in step S7), the cargo attaching/detaching position and height estimating unit 59 ends the process.

A process executed by the management unit 60 is described below. There are two modes for loading the object 30 such as the cargo 32. One mode is a rack loading mode in which the object 30 such as the cargo 32 is loaded onto (or from) a shelf. The other mode is a direct loading mode in which the object 30 such as the cargo 32 is directly loaded onto (or from) the floor (or another object). The mode can be switched between the rack loading mode and the direct loading mode by, for example, the operator of the forklift 10 manually.

Figure 8:
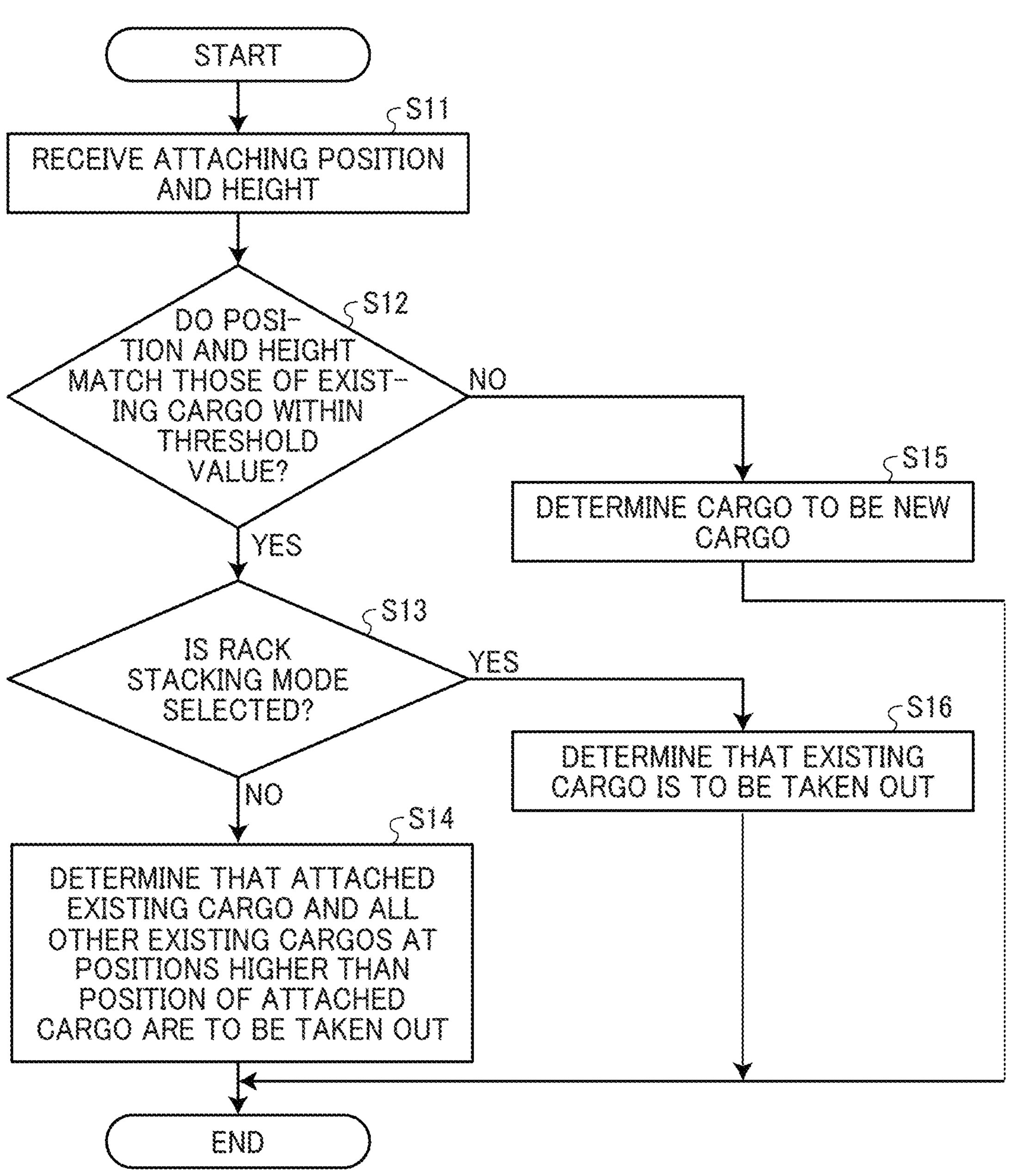
FIG. 8 is a flowchart of a process executed by a management unit at the time of attachment.

A process executed by the management unit 60 at the time of the attachment is described below. FIG. 8 is a flowchart of the process executed by the management unit 60 at the time of the attachment.

In step S11, the management unit 60 receives the attachment position and height of the object 30 such as the cargo 32 calculated by the cargo attaching/detaching position and height estimating unit 59. In step S12, the management unit 60 determines whether the calculated attachment position and height of the object 30 such as the cargo 32 match the position and height of an existing object 30 such as the cargo 32 within a threshold value.

In the case where the calculated attachment position and height of the object 30 such as the cargo 32 are determined to match the attachment position and height of the existing object 30 such as the cargo 32 within the threshold value (YES in step S12), in step S13, the management unit 60 determines whether the rack loading mode in which the object 30 such as the cargo 32 is loaded onto a shelf is selected.

In the case where the rack loading mode is determined not to be selected (NO in step S13), the management unit 60 determines that the direct loading mode in which the objects 30 such as the cargo 32 is directly loaded onto the floor is selected. In step S14, the management unit 60 determines that the existing object 30 such as the cargo 32 attached to the fork 21 and all the other existing objects 30 such as the cargoes 32 loaded at positions higher than the position of the existing object 30 such as the cargo 32 attached to the fork 21 are to be taken out. Then, the management unit 60 ends the process.

On the other hand, in the case where the calculated attachment position and height of the object 30 such as the cargo 32 are determined not to match the position and height of the existing object 30 such as the cargo 32 within the threshold value (NO in step S12), in step S15, the management unit 60 determines that the existing object 30 such as the cargo 32 is the object 30 such as the cargo 32 newly detected. Then, the management unit 60 ends the process.

On the other hand, in the case where the rack loading mode is determined to be selected (YES in step S13), in step S16, the management unit 60 determines that the mode in which the object 30 such as the cargo 32 is to be loaded on a rack (i.e., a shelf) is selected, and determines that the existing object 30 such as the cargo 32 is to be taken out. Then, the management unit 60 ends the process.

Figure 9:
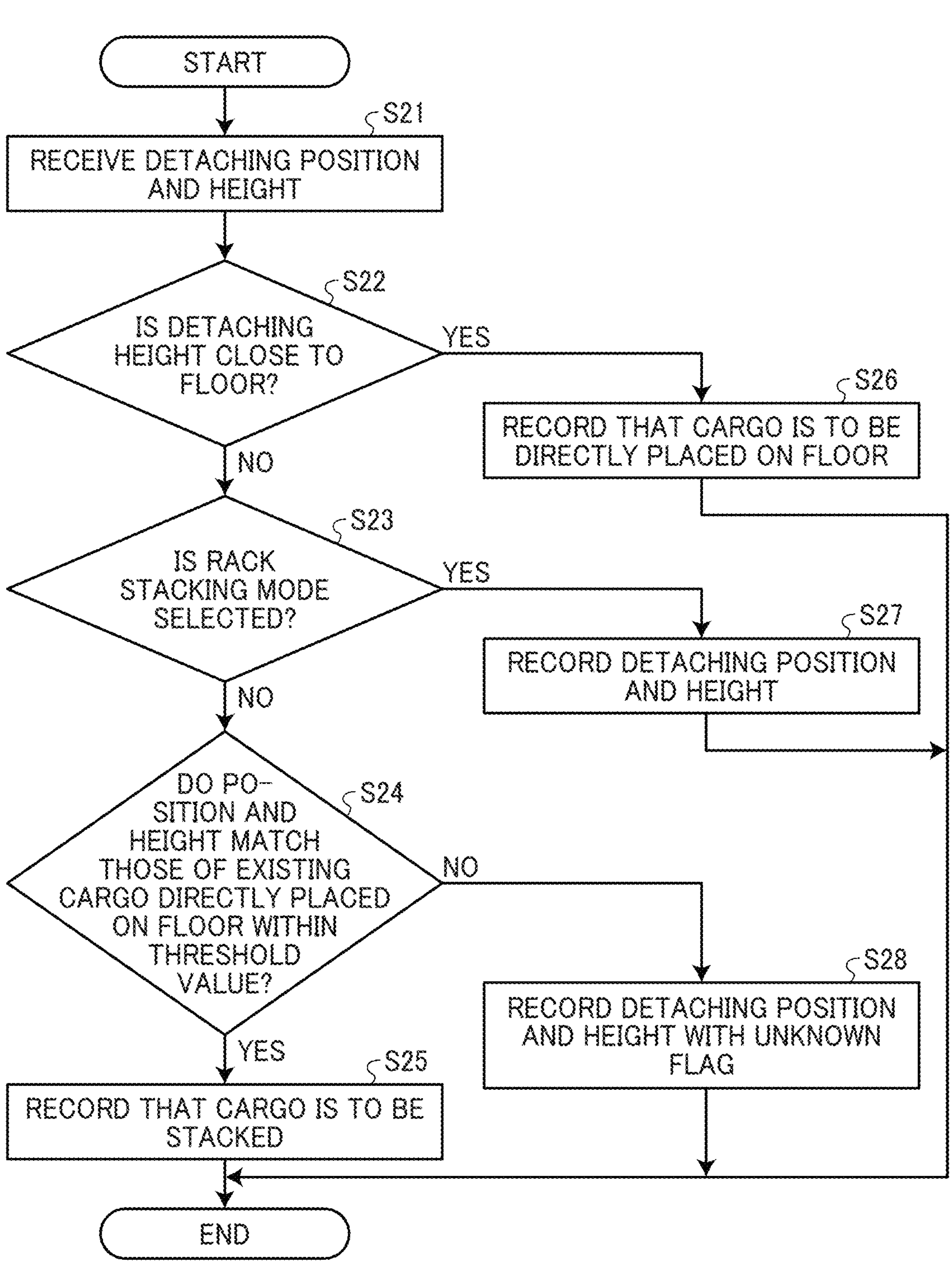
FIG. 9 is a flowchart of a process executed by a management unit at the time of detachment.

A process executed by the management unit 60 at the time of the detachment is described below. FIG. 9 is a flowchart of the process executed by the management unit 60 at the time of the detachment.

In step S21, the management unit 60 receives the attachment position and height of the object 30 such as the cargo 32 calculated by the cargo attaching/detaching position and height estimating unit 59. In step S22, the management unit 60 compares the calculated detached height of the object 30 such as the cargo 32 with a threshold value determined in advance, and determines whether the calculated detached height is close to the floor.

In the case where the detached height is determined not to be close to the floor (NO in step S22), in step S23, the management unit 60 determines whether the rack loading mode in which the object 30 such as the cargo 32 is loaded on a shelf is selected.

In the case where the rack loading mode is determined not to be selected (NO in step S23), the management unit 60 determines that the direct loading mode in which the object 30 such as the cargo 32 is directly loaded onto the floor is selected. In step S24, the management unit 60 determines whether the calculated detached position and height of the object 30 such as the cargo 32 match the position and height of an existing object 30 such as the cargo 32 directly placed on the floor within a threshold value.

In the case where the calculated detached position and height of the object 30 such as the cargo 32 is determined to match the position and height of the existing object 30 such as the cargo 32 within the threshold value (YES in step S24), in step S25, the management unit 60 records that the existing object 30 such as the cargo 32 is to be stacked. Then, the management unit 60 ends the process.

On the other hand, in the case where the calculated detached height of the object 30 such as the cargo 32 is determined to be close to the floor (YES in step S22), in step S26, the management unit 60 records that the existing object 30 such as the cargo 32 is to be directly placed on the floor. Then, the management unit 60 ends the process.

In the case where the rack loading mode is determined to be selected (YES in step S23), the management unit 60 determines that the mode in which the object 30 such as the cargo 32 is loaded on a shelf is selected. In step S27, the management unit 60 records the detached position and height of the object 30 such as the cargo 32. Then, the management unit 60 ends the process.

In the case where the calculated detached position and height of the object 30 such as the cargo 32 is determined not to match the position and height of the existing object 30 such as the cargo 32 within the threshold value (NO in step S24), in step S28, the management unit 60 records the detached position and height of the existing object 30 such as the cargo 32 with an unknown flag indicating that the position and height are unknown. Then, the management unit 60 ends the process.

As described above, when an operation of loading (i.e., stacking) the object 30 such as the cargo 32 onto another object 30 such as another cargo 32 already placed on the floor or carrying the object 30 such as the cargo 32 stacked on another object 30 such as another cargo 32 already placed on the floor is performed, the position information of the object 30 such as the cargo 32 stacked or carried is estimated using the position information of the forklift 10, the detected height of the fork 21, and the position information of the other object 30 such as the other cargo 32 placed on the floor.

The technique in the art has an issue that, depending on the shape of the body of the mobile body, the camera disposed on the backrest at a position on the extension line of the direction in which the backrest is moved up and down cannot capture the image of the marker disposed on the backrest. Therefore, the position of the marker disposed on the backrest cannot be detected, and the height of the object moved by the mobile body may not be estimated.

As described above, according to the present embodiment, the marker is disposed on the backrest that is moved up and down integrally with the fork of the forklift, the spherical camera is disposed at a position not on the same line with respect to the direction in which the marker is moved up and down, an image is captured by the spherical camera, and the height of the fork is estimated through the image recognition. Thus, the height can be estimated not only based on the size of the marker reflected in the image, but also based on the information on the position of the marker in the image. Accordingly, the accuracy of detecting the height of an object moved by the mobile body increases.

According to the present embodiment, the cargo attaching/detaching position and height estimating unit 59 performs the image recognition on the image captured by a single spherical camera 20 having a wide angle of view. Accordingly, the configuration of the imaging device can be simplified.

Second Embodiment

A second embodiment is described below.

The second embodiment differs from the first embodiment in that an information processing system includes a sub-camera disposed at the upper portion of the outer mast 22 and a primary camera disposed at the head guard (i.e., the roof of the driver's seat) 10*a*, whereas the information processing system includes only the spherical camera 20 as the imaging device in the first embodiment. In the following description of the second embodiment, descriptions of elements identical or similar to those in the first embodiment are omitted, and differences from the first embodiment are described.

Figure 10:
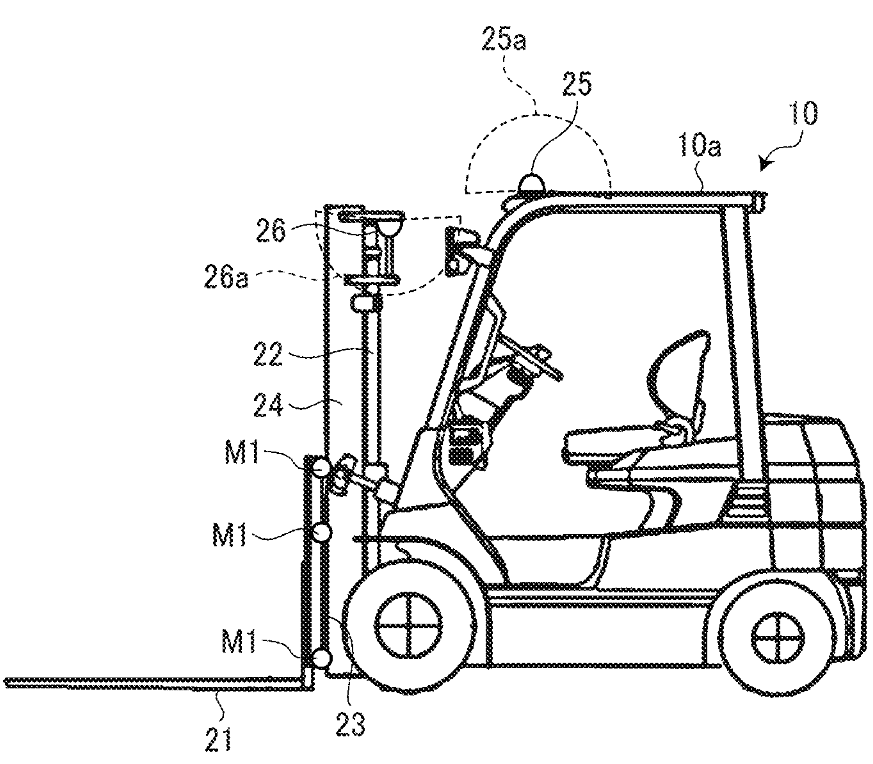
FIG. 10 is a diagram illustrating a configuration of a forklift.

FIG. 10 is a diagram illustrating a configuration of a forklift 10 according to the second embodiment.

As illustrated in FIG. 10, the forklift 10 according to the present embodiment has, instead of the spherical camera 20 in the first embodiment, a primary camera 25 that captures an image in the upward direction and a sub-camera 26 that captures an image in the downward direction. The primary camera 25 and the sub-camera 26 are examples of an imaging device provided for the forklift 10.

As illustrated in FIG. 10, the primary camera 25 is disposed at the head guard 10*a* of the forklift 10. The primary camera 25 is an imaging device that captures an image in the upward direction of 180 degrees around the primary camera 25 as a viewing angle. The primary cameras 25 captures an image in a direction 25*a*.

The image captured by the primary camera 25 is used for determining the position such as the position information of the forklift 10. When the position such as the position information of the forklift 10 indoors is determined using a captured image, it is desirable to use the primary camera 25 that faces upward and captures an image in the upward direction of 180 degrees as a viewing angle, so that the building structures such as the ceiling and pillars are easily reflected in the image.

As illustrated in FIG. 10, the sub-camera 26 is disposed on the outer mast 22 at a position not on the same line with respect to the direction (the vertically upward direction 12) of upward and downward in which the fork 21 of the forklift 10 and the backrest 23 that is moved up and down integrally with the fork 21 move. The sub-camera 26 is an imaging device that captures an image in the downward direction of 180 degrees around the sub-camera 26 as a viewing angle. The sub-camera 26 captures an image in a direction 26*a*.

The state of the object 30 held by the fork 21 of the forklift 10 is detected using the image captured by the sub-camera 26 when the height of the fork 21 is close to the floor.

The image captured by the primary camera 25 and the image captured by the sub-camera 26 are used by the cargo attaching/detaching position and height estimating unit 59 to estimate the attachment or detachment position and height when the forklift 10 attaches or detaches the object 30. The details will be described later. In outline, the cargo attaching/detaching position and height estimating unit 59 uses the image captured by the sub-camera 26 up to a given height from the floor and uses the image captured by the primary camera 25 above the given height for estimating the attaching or detaching position and height when the forklift 10 attaches or detaches the object 30. With such a method, the shielding from the sub-camera 26 to the marker M1 is small, and the primary camera 25 is located far from the rising axis of the marker M1 when the marker M1 is detected by the primary camera 25. Accordingly, the change in height is likely to appear as a change in the position of the marker M1 in the images. This method is advantageous for the counterbalance type forklift truck such as the forklift 10. In the case of the attaching or detaching operation at a high position exceeding the imaging range of the sub-camera 26, the attaching or detaching position of the object 30 is not directly captured by the primary camera 25. However, the attaching or detaching position and height of the object 30 can be estimated by the cargo attaching/detaching position and height estimating unit 59.

In the present embodiment, the marker M1 that serves as a mark disposed on the backrest 23 is imaged by either the primary camera 25 or the sub-camera 26. The image captured by either the primary camera 25 or the sub-camera 26 is subjected to image recognition to detect the type of the marker M1, and the height of the fork 21 is obtained based on the type and position of the detected marker M1.

Switching between the two cameras (the primary camera 25 and the sub-camera 26) performed by the cargo attaching/detaching position and height estimating unit 59 is described below.

Figure 11:
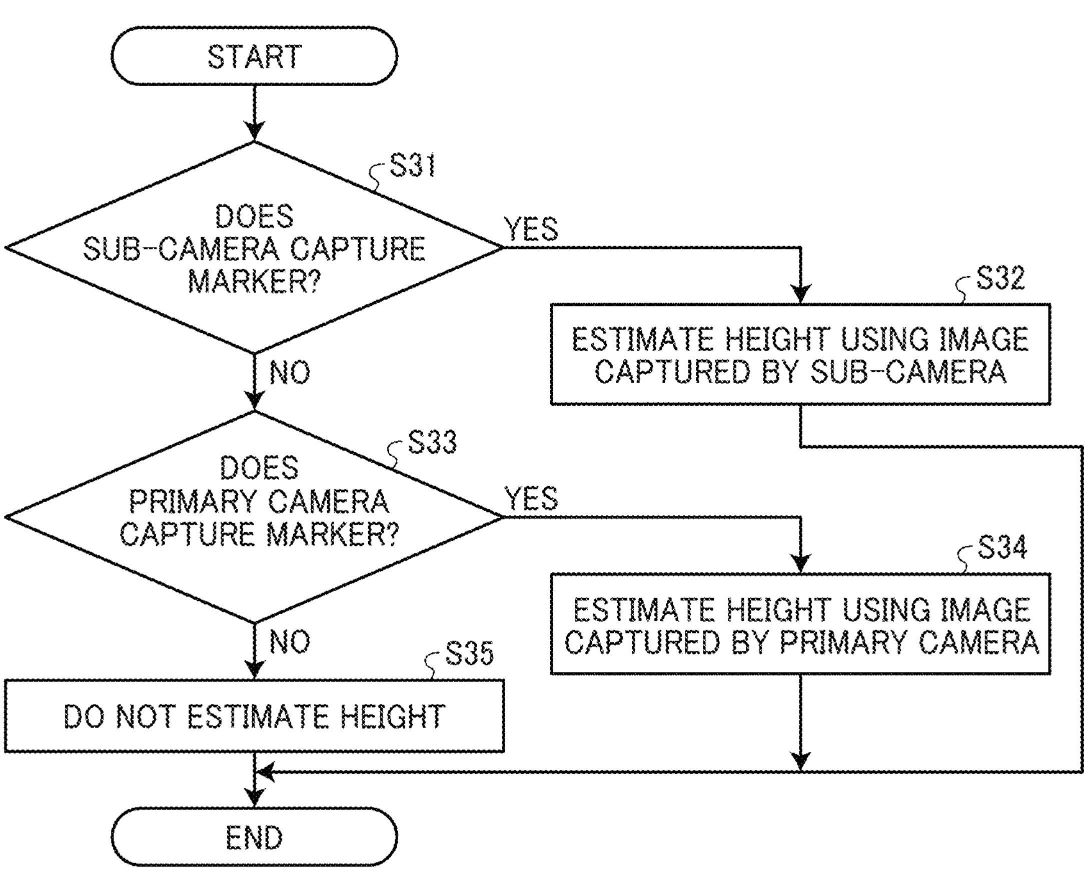
FIG. 11 is a flowchart of a process of switching between two cameras.

FIG. 11 is a flowchart of a process of switching between the two cameras. In the case where the marker M1 is detected by performing image recognition on the image captured by the sub-camera 26 (YES in step S31), in step S32, the cargo attaching/detaching position and height estimating unit 59 estimates the attaching or detaching position and height of the object 30 using the image captured by the sub-camera 26.

On the other hand, in the case where the marker M1 is not detected by performing image recognition on the image captured by the sub-camera 26 (NO in step S31), in step S33, the cargo attaching/detaching position and height estimating unit 59 determines whether the marker M1 can be detected by performing image recognition on the image captured by the primary camera 25.

In the case where the cargo attaching/detaching position and height estimating unit 59 determines that the marker M1 can be detected by performing image recognition on the image captured by the primary camera 25 (YES in step S33), in step S34, the cargo attaching/detaching position and height estimating unit 59 estimates the attaching or detaching position and height of the object 30 using the image captured by the primary camera 25.

On the other hand, in the case where the cargo attaching/detaching position and height estimating unit 59 determines that the marker M1 cannot be detected by performing image recognition on the image captured by the primary camera 25 (NO in step S33), in step S35, the cargo attaching/detaching position and height estimating unit 59 does not estimate the attaching or detaching position and height of the object 30. Then, the cargo attaching/detaching position and height estimating unit 59 ends the process.

As described above, according to the present embodiment, the marker is disposed on the backrest that is moved up and down integrally with the fork of the forklift, the primary camera that captures an image in the upward direction of 180 degrees as a viewing angle is disposed at the head guard of the forklift, the sub-camera that captures an image in the downward direction of 180 degrees as a viewing angle is disposed at a position not on the same line with respect to the direction in which the marker is moved up and down, an image is captured by either the primary camera or the sub-camera, and the height of the fork is estimated through the image recognition. Thus, the height can be estimated not only based on the size of the marker reflected in the image, but also based on the information on the position of the marker in the image. Accordingly, the accuracy of detecting the height of an object moved by the mobile body increases.

In the present embodiment, the markers M1 each having a cylindrical shape and a different pattern are disposed on the backrest 23. However, the configuration of the markers M1 is not limited thereto. For example, the markers M1 each having a different pattern may be configured using light-emitting diodes (LEDs). Alternatively, the components of the backrest 23 may be used as the markers M1.

Third Embodiment

A third embodiment is described below.

The third embodiment differs from the first embodiment or the second embodiment in that a reach type forklift is used as the mobile body, whereas the counterbalance type forklift truck such as the forklift 10 is used as the mobile body in the first embodiment or the second embodiment. In the following description of the third embodiment, descriptions of elements identical or similar to those in the first embodiment or the second embodiment are omitted, and differences from the first embodiment and the second embodiment are described.

Figure 12:
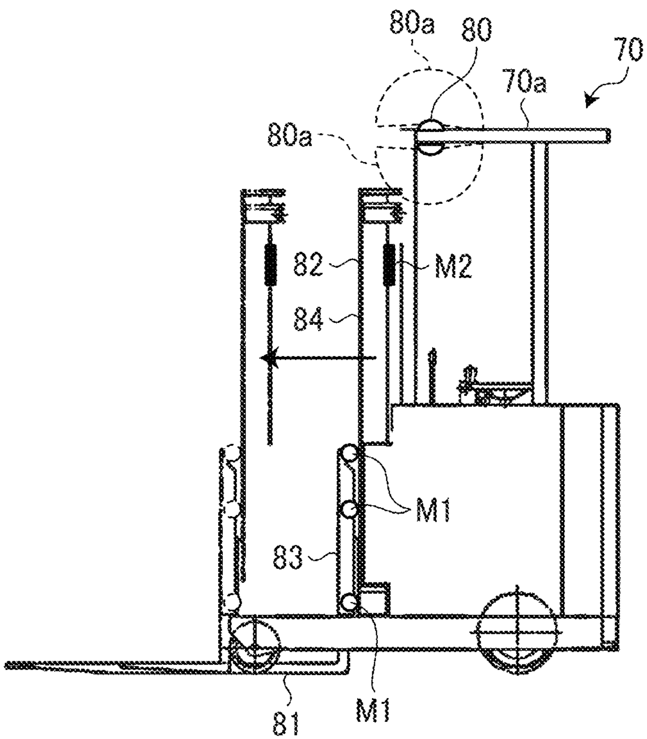
FIG. 12 is a diagram illustrating a configuration of another forklift.

FIG. 12 is a diagram illustrating a configuration of a forklift 70 according to the third embodiment. As illustrated in FIG. 12, the forklift 70 according to the present embodiment is a reach type forklift and includes a fork 81, an outer mast 82 serving as a supporting member, a backrest 83, and an inner mast 84 serving as a member used for ascending and descending. These components extend forward and contract backward, that is, move forward and backward.

As illustrated in FIG. 12, the forklift 70 had a spherical camera 80, which is an imaging device, disposed at the head guard (i.e., the roof of the driver's seat) 70*a* of the forklift 70. The spherical cameras 80 captures an image in a direction 80*a*. In the forklift 70 of the present embodiment, the markers M1 are disposed on the backrest 83, and a marker M2 that is different from the markers M1 is disposed on the outer mast 82.

In the present embodiment, the marker M2 is disposed on the outer mast 82. The marker M2 may be configured using LEDs. Alternatively, a component of the outer mast 82 may be used as the marker M2.

As illustrated in FIG. 12, the forklift 70 has a configuration in which the components including, for example, the fork 81, the outer mast 82, the backrest 83, and the inner mast 84 extend outward (reach). Since the inner mast 84 is disposed inside the outer mast 82, the inner mast 84 is hidden by the outer mast 82 and is not visible from the side in FIG. 12.

With such a configuration, the cargo attaching/detaching position and height estimating unit 59 according to the present embodiment obtains the height of the fork 81 by performing image recognition on the image captured by the spherical camera 80 disposed at the head guard 70*a* and detecting the type of each of the markers M1 disposed on the backrest 83.

In addition, the cargo attaching/detaching position and height estimating unit 59 according to the present embodiment obtains the reach amount of the fork 81, which is the length of the movement of the fork 81, by performing image recognition on the image captured by the spherical camera 80 disposed at the head guard 70*a* and detecting the marker M2 disposed on the outer mast 82. By obtaining the reach amount, the relative positional relationship between the forklift 70 and the object 30 to be carried, that is, the attaching or detaching position of the object 30, can be obtained more accurately.

In the present embodiment, the spherical camera 80 is disposed at the head guard (i.e., the roof of the driver's seat) 70*a* of the forklift 70, but may be disposed at a different portion.

First Modification

Figure 13:
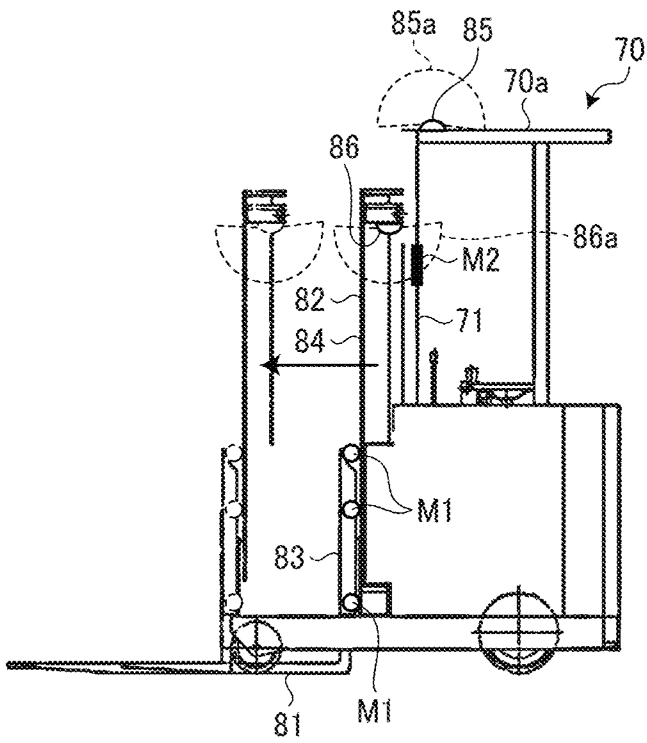
FIG. 13 is a diagram illustrating a configuration of another forklift according to a first modification.

FIG. 13 is a diagram illustrating a configuration of the forklift 70 according to a first modification of the third embodiment. In the first modification illustrated in FIG. 13, the forklift 70 may be provided with a primary camera 85 disposed at the head guard (i.e., the roof of the driver's seat) 70*a* and a sub-camera 86 disposed at the upper portion of the outer mast 82.

The primary camera 85 is an imaging device that captures an image in the upward direction of 180 degrees around the primary camera 85 as a viewing angle. The primary cameras 85 captures an image in a direction 85*a*.

The sub-camera 86 is an imaging device that captures an image in the downward direction of 180 degrees around the sub-camera 86 as a viewing angle. The sub-cameras 86 captures an image in a direction 86*a*.

In the first modification illustrated in FIG. 13, the markers M1 are disposed on the backrest 83, and the marker M2 that is different from the markers M1 is disposed on a body 71 of the forklift 70.

In this case, the cargo attaching/detaching position and height estimating unit 59 obtains the height of the fork 81 by performing image recognition on the image captured by the primary camera 85 disposed at the head guard 70*a* or the sub-camera 86 disposed at the outer mast 82 and detecting the type of each of the markers M1 disposed on the backrest 83.

In addition, the cargo attaching/detaching position and height estimating unit 59 obtains the reach amount of the fork 81 by performing image recognition on the image captured by the sub-camera 86 disposed at the upper portion of the outer mast 82 and detecting the marker M2 disposed on the body of the forklift 70. Furthermore, since the sub-camera 86 can easily recognize the markers M1 disposed on the backrest 23 without any obstruction, the cargo attaching/detaching position and height estimating unit 59 can stably detect the height of the forks 81.

Second Modification

Figure 14:
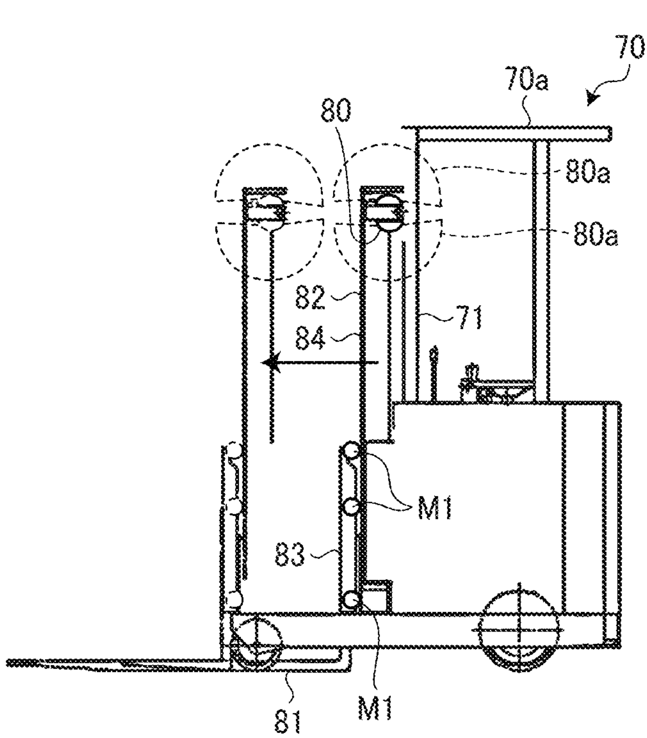
FIG. 14 is a diagram illustrating a configuration of another forklift according to a second modification.

FIG. 14 is a diagram illustrating a configuration of the forklift 70 according to a second modification of the third embodiment. In the second modification illustrated in FIG. 14, the spherical camera 80 is disposed not at the head guard (i.e., the roof of the driver's seat) 70*a* of the forklift 70 but at the upper portion of the outer mast 82.

In this case, the cargo attaching/detaching position and height estimating unit 59 can perform the determination of the position of the vehicle body, the determination whether the object is present, and the detection of the height of the forks 81, all with reference to the outer mast 82. In the case of the reach type forklift, the detection of the reach amount using the marker M2 is not required.

In the present embodiment, a forklift is used as an example of the mobile body, but the mobile body is not limited thereto. For example, the mobile body may be an automated guided vehicle or a drone.

Each of the functions of the embodiments described above may be implemented by one or more processing circuits or circuitry. The "processing circuit or circuitry" herein includes a programmed processor to execute each function by software, such as a processor implemented by an electronic circuit, and devices, such as an application-specific integrated circuit (ASIC), a digital signal processor (DSP), a field-programmable gate array (FPGA), and circuit modules known in the art arranged to perform the recited functions.

The information processing apparatus is not limited to the on-premise server 50 as long as the information processing apparatus has a communication function. The information processing apparatus may be, for example, a projector, an interactive white board (IWB; an electronic white board having a blackboard function capable of mutual communication), an output device such as a digital signage, a head-up display (HUD) device, an industrial machine, an imaging device, a sound collecting device, a medical device, a network home appliance, an automobile (connected car), a laptop PC, a mobile phone, a smartphone, a tablet terminal, a game console, a personal digital assistant (PDA), a digital camera, a wearable PC, or a desktop PC.

Aspects of the present disclosure are, for example, as follows.

According to Aspect 1, an information processing system includes a mobile body including a holding device that holds an object and allows the object to be moved up and down and a marker disposed on the holding device, at least one imaging device that is disposed at the mobile body at a position not on the same line with respect to the direction in which the object is moved up and down and captures an image of the surroundings of the mobile body, and an estimating unit that detects the position of the marker based on an image of the marker captured by the one imaging device to estimate the height of the object.

According to Aspect 2, in the information processing system of Aspect 1, the estimating unit detects the position of the marker based on a spherical image of the marker captured by an imaging device having a wide angle of view.

According to Aspect 3, in the information processing system of Aspect 1, the estimating unit detects the position of the marker based on an image of the marker captured by an imaging device that captures an image in the upward direction of 180 degrees or closed to 180 degrees as a viewing angle and estimates the height of the object above a given height, and detects the position of the marker based on an image of the marker captured by another imaging device that captures an image in the downward direction of 180 degrees or closed to 180 degrees as a viewing angle and estimates the height of the object up to the given height.

According to Aspect 4, in the information processing system of Aspect 1, the estimating unit detects the position of the marker based on an image of the marker captured by an imaging device that is disposed at the roof of the driver's seat of the mobile body and has a wide angle of view.

According to Aspect 5, in the information processing system of Aspect 1, the estimating unit estimates the reach amount of the holding device based on an image captured by the one imaging device.

According to Aspect 6, in the information processing system of Aspect 1, the estimating unit estimates the reach amount of the holding device based on an image captured by the one imaging device disposed at the holding device.

According to Aspect 7, in the information processing system of any one of Aspects 1 to 6, the estimating unit detects the position of the marker based on an image of the marker having a cylindrical shape and disposed on the holding device to estimate the height of the object.

According to Aspect 8, the information processing system of any one of Aspects 1 to 7 further includes a management unit that recognizes and records the state of attachment or detachment of the object in the mobile body.

According to Aspect 9, an information processing apparatus processes position information of an object moved by a mobile body including a holding device that holds the object and allows the object to be moved up and down and a marker disposed on the holding device, and includes an estimating unit that detects the position of the marker disposed on the holding device based on an image of the marker captured by at least one imaging device disposed at the mobile body at a position not on the same line with respect to the direction in which the object is moved up and down to estimate the height of the object.

According to Aspect 10, an information processing method performed by an information processing apparatus includes processing position information of an object moved by a mobile body including a holding device that holds the object and allows the object to be moved up and down and a marker disposed on the holding device, and detecting the position of the marker disposed on the holding device based on an image of the marker captured by at least one imaging device disposed at the mobile body at a position not on the same line with respect to the direction in which the object is moved up and down to estimate the height of the object.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An information processing system comprising:

a mobile body including a holding device that holds an object and allows the object to be moved up and down and a marker disposed on the holding device;

at least one imaging device disposed at the mobile body at a position not on a same line with respect to a direction in which the object is moved up and down and captures an image of surroundings of the mobile body; and circuitry configured to detect a position of the marker based on an image of the marker captured by the at least one imaging device to estimate a height of the object.

2. The information processing system according to claim 1, wherein the imaging device includes a first imaging device having a wide angle of view of 360 degrees or substantially 360 degrees, and wherein the circuitry is configured to detect the position of the marker based on a spherical image of the marker captured by the first imaging device.

3. The information processing system according to claim 1, wherein the at least one imaging device includes a second imaging device having a viewing angle of 180 degrees or substantially 180 degrees and a third imaging device having a viewing angle of 180 degrees or substantially 180 degrees, and wherein the circuitry is configured to:

detect the position of the marker based on an image of the marker captured by the second imaging device that captures an image in an upward direction and estimate the height of the object above a given height; and detect the position of the marker based on an image of the marker captured by the third imaging device that captures an image in a downward direction and estimate the height of the object up to the given height.

4. The information processing system according to claim 2, wherein the first imaging device is disposed at a roof of a driver's seat of the mobile body.

5. The information processing system according to claim 1, wherein the circuitry is configured to estimate a reach amount of the holding device based on an image captured by the at least one imaging device.

6. The information processing system according to claim 5, wherein the at least one imaging device is disposed at the holding device.

7. The information processing system according to claim 1, wherein the circuitry is configured to detect the position of the marker based on an image of the marker having a cylindrical shape and disposed on the holding device to estimate the height of the object.

8. The information processing system according to claim 1, wherein the circuitry is further configured to recognize and record a state of attachment or detachment of the object in the mobile body.

9. An information processing apparatus for processing position information of an object, comprising circuitry configured to detect a position of a marker disposed on a holding device included in a mobile body based on an image of the marker captured by at least one imaging device disposed at the mobile body at a position not on a same line with respect to a direction in which the object is moved up and down by the holding device to estimate a height of the object.

10. An information processing method performed by an information processing apparatus, the method comprising:

processing position information of an object moved by a mobile body including a holding device that holds the object and allows the object to be moved up and down and a marker disposed on the holding device; and detecting a position of the marker disposed on the holding device based on an image of the marker captured by at least one imaging device disposed at the mobile body at a position not on a same line with respect to a direction in which the object is moved up and down to estimate a height of the object.

* * * * *